(12) United States Patent
Bao

(10) Patent No.: US 10,163,373 B2
(45) Date of Patent: Dec. 25, 2018

(54) METHOD FOR UPDATING THE POSITION OF ELECTRONIC PRICE TAG BY GRAPHIC CODE

(71) Applicant: WUXI VISION PEAK TECHNOLOGY CO., LTD, Wuxi (CN)

(72) Inventor: Jin Bao, Wuxi (CN)

(73) Assignee: WUXI VISION PEAK TECHNOLOGY CO., LTD, Wuxi (CN)

( * ) Notice: Subject to any disclaimer, the term of this patent is extended or adjusted under 35 U.S.C. 154(b) by 0 days.

(21) Appl. No.: 15/540,574

(22) PCT Filed: Aug. 2, 2016

(86) PCT No.: PCT/CN2016/092825
§ 371 (c)(1),
(2) Date: Jun. 29, 2017

(87) PCT Pub. No.: WO2018/000513
PCT Pub. Date: Jan. 4, 2018

(65) Prior Publication Data
US 2018/0204487 A1 Jul. 19, 2018

(51) Int. Cl.
*G09F 3/20* (2006.01)
*G06K 19/06* (2006.01)
(Continued)

(52) U.S. Cl.
CPC ............... *G09F 3/208* (2013.01); *G06K 7/14* (2013.01); *G06K 7/1413* (2013.01);
(Continued)

(58) Field of Classification Search
CPC .. G09F 3/208; G06K 19/06112; G09G 5/373; G09G 5/377; G09G 5/38; G09G 2380/04
See application file for complete search history.

(56) References Cited

U.S. PATENT DOCUMENTS 5,473,146 A * 12/1995 Goodwin, III ......... G06Q 30/02
235/383
5,853,196 A * 12/1998 Wilkus .................... G09F 3/204
283/81
(Continued)

FOREIGN PATENT DOCUMENTS

CN 1689018 A 10/2005
CN 102938082 A 2/2013
(Continued)

*Primary Examiner* — Daniel Walsh
(74) *Attorney, Agent, or Firm* — Gokalp Bayramoglu

(57) ABSTRACT

A method for updating the position of electronic price tag by graphic code including: step 1, placing a plurality kinds of commodities on a commodity shelf, mounting an electronic price tag screen on the commodity shelf and below the commodities; step 2, displaying at least n position graphic codes with an even interval on the electronic price tag screen; step 3, carrying out a first scan to send the commodity information to a server; step 4, carrying out a second scan to check a position of the commodity; step 5, sending a plurality of size graphic codes with different size information to a position where the position graphic code in step 4 locates; step 6, selecting a size graphic code with a proper size for a third scan by the supermarket tally clerk; step 7, generating a commodity tag by the server.

4 Claims, 2 Drawing Sheets

(51) Int. Cl.
*G09G 5/373* (2006.01)
*G09G 5/377* (2006.01)
*G09G 5/38* (2006.01)
*G06K 7/14* (2006.01)

(52) U.S. Cl.
CPC ......... *G06K 19/06112* (2013.01); *G09G 5/38* (2013.01); *G09G 2380/04* (2013.01)

(56) References Cited

U.S. PATENT DOCUMENTS

| | | | | |
|---|---|---|---|---|
| 6,543,688 | B1 * | 4/2003 | Massaro | A47F 5/0068 235/383 |
| 6,550,673 | B2 * | 4/2003 | Massaro | A47F 5/0068 235/383 |
| 6,749,116 | B2 * | 6/2004 | Massaro | A47F 5/0068 235/383 |
| 7,210,623 | B2 * | 5/2007 | Capurso | G09F 3/204 235/375 |
| 7,258,266 | B1 * | 8/2007 | Bowe, Jr. | G06Q 10/00 235/375 |
| 7,287,001 | B1 * | 10/2007 | Falls | G06Q 10/087 235/383 |
| 8,172,096 | B2 * | 5/2012 | Van De Steen | A47B 96/02 211/119.003 |
| 8,556,172 | B2 * | 10/2013 | Nakamura | G06Q 30/0603 235/385 |
| 8,698,606 | B2 * | 4/2014 | Choi | G06Q 30/06 340/10.6 |
| 8,751,318 | B2 * | 6/2014 | Kim | G06Q 30/02 705/21 |
| 8,833,654 | B1 * | 9/2014 | Grant | G06Q 10/0833 235/383 |
| 2001/0020935 | A1 * | 9/2001 | Gelbman | G06F 3/147 345/173 |
| 2002/0034067 | A1 * | 3/2002 | Massaro | A47F 5/0068 361/728 |
| 2002/0175209 | A1 * | 11/2002 | Itoh | G06K 7/10851 235/462.25 |
| 2003/0025690 | A1 * | 2/2003 | Crooks | G06F 3/147 345/211 |
| 2005/0103853 | A1 * | 5/2005 | Stephenson | C09K 19/544 235/462.15 |
| 2006/0279527 | A1 * | 12/2006 | Zehner | G06Q 30/00 345/107 |
| 2008/0052198 | A1 * | 2/2008 | Hosokawa | G06Q 10/087 705/28 |
| 2008/0164310 | A1 * | 7/2008 | Dupuy | G06F 3/147 235/385 |
| 2009/0179825 | A1 * | 7/2009 | Enarvi | G06F 3/147 345/30 |
| 2009/0273443 | A1 * | 11/2009 | Nilsson | G06F 3/147 340/5.91 |
| 2010/0031548 | A1 * | 2/2010 | Lee | G09F 3/204 40/655 |
| 2010/0123005 | A1 * | 5/2010 | Guess | G06K 7/10871 235/383 |
| 2010/0138322 | A1 * | 6/2010 | Nakamura | G06Q 10/087 705/28 |
| 2010/0225444 | A1 * | 9/2010 | Nobutsugu | G06F 3/147 340/5.91 |
| 2011/0025461 | A1 * | 2/2011 | Nobutsugu | G06Q 10/087 340/5.92 |
| 2011/0102144 | A1 * | 5/2011 | Okina | G06Q 30/02 340/5.91 |
| 2012/0067944 | A1 * | 3/2012 | Ross | G06K 7/1095 235/375 |
| 2012/0169477 | A1 * | 7/2012 | Seo | G09F 3/204 340/10.6 |
| 2013/0036636 | A1 * | 2/2013 | Karhuketo | G09F 3/204 40/299.01 |
| 2013/0076586 | A1 * | 3/2013 | Karhuketo | H01Q 1/526 343/841 |
| 2013/0132180 | A1 * | 5/2013 | Aihara | G06Q 30/0222 705/14.23 |
| 2013/0226742 | A1 * | 8/2013 | Johnson | G06Q 30/02 705/27.1 |
| 2014/0210692 | A1 * | 7/2014 | Waters | G06F 3/147 345/2.3 |
| 2015/0199942 | A1 * | 7/2015 | Mochizuki | G06F 3/1431 345/531 |
| 2015/0332356 | A1 * | 11/2015 | Byun | G06Q 30/06 345/2.3 |
| 2015/0348450 | A1 * | 12/2015 | Park | G09F 3/208 340/5.91 |
| 2016/0026032 | A1 * | 1/2016 | Moore | G06K 7/10316 382/103 |
| 2016/0134930 | A1 * | 5/2016 | Swafford | A47F 5/0068 725/80 |
| 2017/0293959 | A1 * | 10/2017 | Itou | G06Q 30/0623 |

FOREIGN PATENT DOCUMENTS

CN  103714469 A  4/2014
JP  2007167551 A  7/2007

* cited by examiner

METHOD FOR UPDATING THE POSITION OF ELECTRONIC PRICE TAG BY GRAPHIC CODE

CROSS REFERENCE TO RELATED APPLICATIONS

This application is the national phase entry of International Application No. PCT/CN2016/092825, filed on Aug. 2, 2016, which is based upon and claims priority to Chinese Patent Application No. 2016104817078 filed on Jun. 28, 2016, the entire contents of which are incorporated herein by reference.

TECHNICAL FIELD

The present invention relates to the field of electronic paper display, particularly to a method for updating the position of electronic price tag by graphic code.

BACKGROUND OF THE INVENTION

The existing electronic price tag has a length of about 30-80 mm, and a width of about 30-40 mm. A single electronic price tag corresponds to a single commodity in a one-to-one manner. The electronic price tag is attached under the corresponding commodity. First, a supermarket tally clerk scans the graphic code on the commodity to send the information of the commodity to a server. Subsequently, the supermarket tally clerk scans the graphic code of price information on the electronic price tag under the commodity and the price information is sent to the server. Moreover, the price information of the commodity is sent to the electronic price tag for displaying by the server. The size of the electronic price tag is fixed and cannot be easily changed.

As described above, since a large amount of electronic price tag screens are used, an electronic price tag with a big size can be considered to replace several adjacent electronic price tags with a small size, which is faster and more convenient. However, since the electronic price tag could not be positioned accurately for multiple commodities and is limited to display only the commodity information, the electronic price tag therefore fails to correspond to the commodity in a one-to-one manner, such that using a large price tag could not be used in practice.

SUMMARY OF THE INVENTION

With regard to the drawbacks of the prior art, a method for updating the position of electronic price tag by graphic code is disclosed by the present invention.

The technical solution of the present invention is as below.

A method for updating the position of electronic price tag by graphic code includes following steps:

step 1, placing n (n≥1) kinds of commodity on a commodity shelf, attaching a commodity information graphic code on a package of each commodity; placing a plurality of commodities of the same kind continuously; each kind of commodity successively occupying a length of $l_1, l_2, \ldots, l_n$; mounting an electronic price tag screen on the commodity shelf and below the commodities; a length of the electronic price tag screen is $d=l_1+l_2+ \ldots +l_n$;

step 2, displaying at least n position graphic codes with an even interval on the electronic price tag screen;

step 3, carrying out a first-time scan by a supermarket tally clerk, scanning the commodity information graphic code of a $x_{th}$ kind of commodity (x=1, 2, . . . , n) on the packaging, sending the commodity information to a server;

step 4, the $x_{th}$ kind of commodity occupying a length $l_x$ on the commodity shelf, carrying out a second scan on a nearest position graphic code adjacent to a position of $l_x/2$ by the supermarket tally clerk, to locate a position of the $x_{th}$ kind of commodity, sending information of the position to the server;

step 5, after the server receives information of the position, sending a plurality of size graphic codes with different size information to a position where the position graphic code in step 4 locates;

step 6, selecting a size graphic code with a proper size from step 5 for a third time scan according to the length $l_x$ of the commodity shelf occupied by the $x_{th}$ kind of commodity in step 1 by the supermarket tally clerk, and sending the size information to the server;

step 7, generating a commodity tag by the server according to commodity information and the size information, and sending the commodity tag to the position in step 4, displaying the commodity tag on the electronic price tag screen.

Furthermore, a length of the electronic price tag screen is in a range of 300-400 mm, and the width is in a range of 25-35 mm.

Furthermore, in step 5, sending three size graphic codes marked with "large", "medium", "small" to the position in step 4. If the supermarket tally clerk selects a size graphic code marked with "large" to scan in step 6, then an electronic price tag with a length of 14.57 cm is generated in step 7. If the supermarket tally clerk selects a size graphic code marked with "medium" to scan in step 6, then an electronic price tag with a length of 9.67 cm is generated in step 7. If the supermarket tally clerk selects a size graphic code marked with "small" to scan in step 6, then an electronic price tag with a length of 5.13 cm is generated in step 7.

Furthermore, the graphic code is a bar code or a two-dimensional code.

The beneficial effects of the present invention is as below.

In the present invention, the amount of electronic price tags is reduced, and a plurality of electronic price tag screens are not required to be mounted corresponding to the commodities in a one-to-one manner by the supermarket staff, instead, only an electronic price tag screen with a relatively larger size is mounted to the commodity shelf. Thus, the working time is saved, the cost of electronic price tags is greatly reduced, and the supermarket can save on labor.

When the commodity information of a plurality of adjacent commodities changes at the same time, the server only needs to send data to one display screen and the information of the plurality of commodities is changed at the same time, such that the transmission is fast, and the speed of synchronously updating the commodity information is also improved.

The present invention can be used in retail industries, such as supermarkets, convenience stores, drugstores, cosmetics stores, etc., and is highly practicle. The present invention can be used to display all kinds of bar codes and two-dimensional codes or any other kinds of graphic codes.

DETAILED DESCRIPTION OF THE INVENTION

In the present embodiment, the graphic code is specifically a bar code. The solution provided by the present invention also applies to the two-dimensional code.

The present invention includes following steps.

Step 1, n (n≥1) kinds of commodities are placed on a same row of the commodity shelf, and the package of each commodity is attached with a commodity information graphic code. A variety of commodities of the same kind are continuously placed. Each kind of commodity successively occupies a length of $l_1, l_2, \ldots, l_n$ on the commodity shelf. The electronic price tag screen is mounted on the commodity shelf and below the commodities. A length of the electronic price tag screen is $d=l_1+l_2+ \ldots +l_n$, namely, the length of the electronic price tag can cover all of the commodities in this row. Generally, the length of the electronic price tag screen is in a range of 300-400 mm, and the width is in a range of 25-35 mm.

Step 2, a plurality of position graphic codes with an even interval are displayed on the electronic price tag screen. The specific interval can be set according to the requirement. For instance, the distance between two adjacent position graphic codes can be set as 10 cm.

Step 3, the supermarket tally clerk carries out the first scan, namely, the commodity information graphic code of a $x_{th}$ kind of commodity (x=1, 2, . . . , n) on the package is scanned, and the commodity information is sent to the server.

Figure 1:
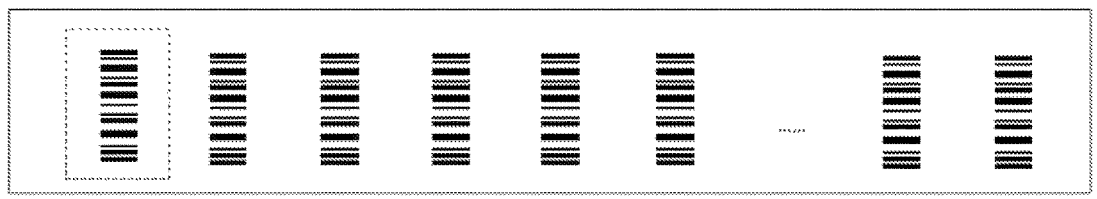
FIG. 1 is a schematic diagram of the second scan.

Step 4, the $x_{th}$ kind of commodity occupies a length $l_x$ on the commodity shelf. A second scan is carried out by the supermarket tally clerk, namely, a nearest position graphic code adjacent to a position of $l_x/2$ is scanned, to locate the position of the $x_{th}$ kind of commodity, and the information of the position is sent to the server. FIG. 1 is a schematic diagram of the second scan. With reference to FIG. 1, in FIG. 1, the block shows the position graphic code scanned in the second scan. In step 4, the position graphic code located in the middle part of the position occupied by this kind of commodity is scanned. Furthermore, in FIG. 1, an arrangement manner of a plurality of position graphic codes is showed.

Step 5, after the server receives information of the position, a plurality of size graphic codes with different size information are sent to a position where the position graphic code locates in step 4.

In the present embodiment, the server sends three size graphic codes marked with "large", "medium", "small" to the position in step 4.

Figure 2:
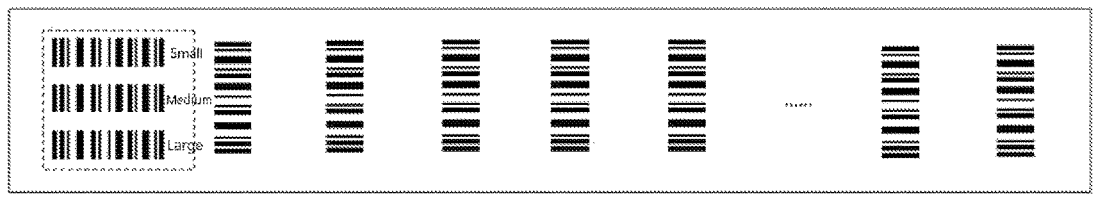
FIG. 2 is a schematic diagram of the third scan.

Step 6, the supermarket tally clerk selects a size graphic code with a proper size from step 5 for a third scan according to the length $l_x$ of the commodity shelf occupied by the $x_{th}$ kind of commodity in step 1, and the size information is sent to the server. FIG. 2 is a schematic diagram of the third scan. In FIG. 2, the block on the left shows the three size graphic codes mentioned in step 5. The three bar codes correspond to the price tags with different sizes respectively. In step 6, a size graphic code selected from the three size graphic codes is scanned. Specifically, with regard to the length of the placed commodities, the size of the price tag could be determined. If the commodities are narrowly placed, a size graphic code with a small size could be selected to scan, and a commodity tag with a small size is generated. If the commodities are widely placed, a commodity tag with a large size would be generated.

Figure 3:
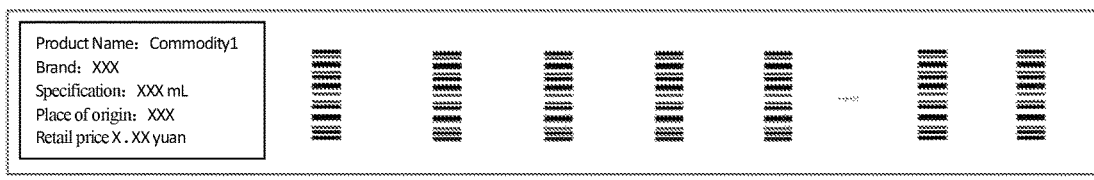
FIG. 3 is a schematic diagram of the commodity tag displayed on the electronic price tag screen.

Step 7, a commodity tag is generated by the server according to commodity information and the size information. Moreover, the commodity tag is sent to the position in step 4, and displayed on the electronic price tag screen. FIG. 3 is a schematic diagram of the commodity tag displayed on the electronic price tag screen.

The specific size of the commodity tag could be set according to the requirement. In the present embodiment, if the supermarket tally clerk selects a size graphic code marked with "large" to scan in step 6, then an electronic price tag with a length of 14.57 cm is generated in step 7. If the supermarket tally clerk selects a size graphic code marked with "medium" to scan in step 6, then an electronic price tag with a length of 9.67 cm is generated in step 7. If the supermarket tally clerk selects a size graphic code marked with "small" to scan in step 6, then an electronic price tag with a length of 5.13 cm is generated in step 7.

Figure 4:
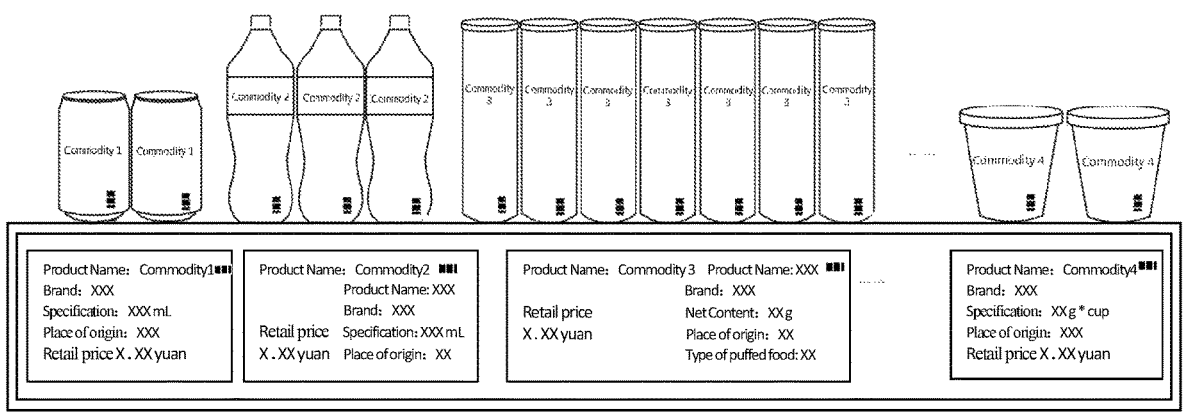
FIG. 4 is a schematic diagram for showing the practical result of the present invention.

FIG. 4 is a schematic diagram for showing the practical result of the present invention. The final display result is shown in FIG. 4, with regard to the placed commodities of different lengths, the commodity tags of the corresponding lengths could be generated, and the display positions of the commodity tags locate in the middle part of position of the placed commodity.

The above mentioned is only the preferred embodiment of the present invention, which is not limited by above embodiment. It should be understood that any improvement and variation directly derived from or associated with the present invention by those skilled in the art, without departing from the spirit and idea of the present invention, are all supposed to fall within the protective scope of the present invention.

What is claimed is:

1. A method for updating the position of electronic price tag by graphic code, the method comprising following steps:
    step 1: placing n(n≥2) kinds of commodities on a commodity shelf, attaching a commodity information graphic code on a package of each commodity; placing a plurality of commodities of the same kind continuously, each kind of commodity successively occupying a length of $l_1, l_2, \ldots, l_n$ on the commodity shelf; mounting an electronic price tag screen on the commodity shelf and below the commodities, wherein a length of the electronic price tag screen is $d=l_1+l_2+\ldots +l_n$;
    step 2: displaying at least n position graphic codes with a predetermined interval between two adjacent graphic codes on the electronic price tag screen;
    step 3: carrying out a first scan by a supermarket tally clerk, scanning the commodity information graphic code of a $x_{th}$ kind of commodity (x=1,2, . . . ,n) on the package of the $x_{th}$ kind of commodity, sending commodity information to a server;
    step 4: the $x_{th}$ kind of commodity occupying a length $l_x$ on the commodity shelf, carrying out a second scan on a nearest position graphic code adjacent to a position of $l_x/2$ by the supermarket tally clerk, to locate a position of the $x_{th}$ kind of commodity, sending information of the position of the $x_{th}$ kind of commodity to the server;
    step 5: after the server receives the information of the position of the $x_{th}$ kind of commodity from step 4, sending a plurality of size graphic codes with different size information to the position of the $x_{th}$ kind of commodity, which was determined in step 4;
    step 6: selecting one of the plurality of size graphic codes from step 5 with a third scan, according to the length $l_x$ of the commodity shelf occupied by the $x_{th}$ kind of commodity in step 1 by the supermarket tally clerk, and sending size information from the third scan to the server;

step 7: generating a commodity tag by the server according to the commodity information and the size information, and sending the commodity tag to the position of the $x_{th}$ kind of commodity in step 4, displaying the commodity tag on the electronic price tag screen.

2. The method for updating the position of electronic price tag by graphic code of claim 1, wherein, a length of the electronic price tag screen is in a range of 300-400 mm, and a width of the electronic price tag screen is in a range of 25-35 mm.

3. The method for updating the position of electronic price tag by graphic code of claim 1, wherein, in step 5, the plurality of size graphic codes are three size graphic codes marked with "large", "medium", and "small" to the position of the $x_{th}$ kind of commodity in step 4; if the supermarket tally clerk selects the size graphic code marked with "large" to scan in step 6, then an electronic price tag with a length of 14.57 cm is generated in step 7; if the supermarket tally clerk selects the size graphic code marked with "medium" to scan in step 6, then an electronic price tag with a length of 9.67 cm is generated in step 7; if the supermarket tally clerk selects the size graphic code marked with "small" to scan in step 6, then an electronic price tag with a length of 5.13 cm is generated in step 7.

4. The method for updating the position of electronic price tag by graphic code of claim 1, wherein, the graphic code is a bar code or a two-dimensional code.

* * * * *